United States Patent [19]

Smith et al.

[11] Patent Number: 4,970,127

[45] Date of Patent: Nov. 13, 1990

[54] NOVEL VINYL CHLORIDE RESINS AND COMPOSITIONS INCORPORATING SUCH RESINS

[75] Inventors: Donald F. Smith, Bridgewater; Ismael Colon, Piscataway; James R. Harvey, Bridgewater, all of N.J.

[73] Assignee: Union Carbide Chemicals and Plastics Company Inc., Danbury, Conn.

[21] Appl. No.: 368,901

[22] Filed: Jun. 21, 1989

Related U.S. Application Data

[63] Continuation of Ser. No. 921,915, Oct. 20, 1986, abandoned.

[51] Int. Cl.$^5$ .............................................. G11B 23/00
[52] U.S. Cl. ............................. 428/694; 252/62.54; 427/128; 428/522; 428/695; 428/900; 526/318.3; 526/329.4
[58] Field of Search ................. 428/425.9, 694, 695, 428/900, 328, 329, 522; 427/131, 128; 252/62.54; 526/329.4, 318.3

[56] References Cited

U.S. PATENT DOCUMENTS

| | | | |
|---|---|---|---|
| 3,224,982 | 12/1965 | Zutty et al | 521/77 |
| 3,321,417 | 5/1967 | Zutty et al. | 521/77 |
| 4,147,853 | 4/1979 | Goswami et al. | 526/278 |
| 4,368,237 | 1/1983 | Yamada | 428/413 |
| 4,431,712 | 2/1984 | Matsufuji et al. | 428/692 |
| 4,476,035 | 10/1984 | Miyoshi et al. | 252/62.54 |
| 4,529,661 | 7/1985 | Ninomiya et al. | 428/329 |
| 4,562,117 | 12/1985 | Kikukawa | 428/407 |
| 4,594,174 | 6/1986 | Nakayama | 252/62.54 |
| 4,600,521 | 7/1986 | Nakamura | 428/694 |
| 4,613,545 | 9/1986 | Chubachi | 428/900 |
| 4,707,411 | 11/1987 | Nakayama | 428/522 |

*Primary Examiner*—Paul J. Thibodeau
*Attorney, Agent, or Firm*—Jean B. Mauro

[57] ABSTRACT

Novel vinyl chloride copolymers including a hydroxyalkyl acrylate or metacrylate or allyl alcohol, an acid functionality from carboxylic acid-containing monomers and optionally an epoxy-containing vinyl monomer in selected proportions provide suitable binder resins for applications such as magnetic recording media, imparting enhanced dispersion and magnetic property characteristics while also having desirable rheological characteristics and, when the epoxy-containing vinyl monomer is used, desirable thermal stability.

12 Claims, No Drawings

NOVEL VINYL CHLORIDE RESINS AND COMPOSITIONS INCORPORATING SUCH RESINS

This application is a continuation of prior U.S. application Ser. No. 921,915 filing data Oct. 20, 1986, now abandoned.

BACKGROUND OF THE INVENTION

1. Field Of The Invention

This invention relates to novel vinyl chloride resins and, more particularly, to novel resins for use in compositions, to be used as magnetic recording media, enhancing the dispersion, rheological and magnetic property characteristics of such composites.

2. Description Of The Prior Art

Over the years, magnetic recording has come to occupy a vital place in a myriad of industries. Magnetic tape is accordingly utilized for audio, video, computer, instrumentation and other recordings. Magnetic recording media are utilized in a variety of forms, including, for example, magnetic cards and disks, reels, video tapes, high performance audio tapes, computer tapes, floppy disks and the like.

While there are several different types of magnetic recording media, all types consist of a layer of magnetic particles, sometimes referred to as "pigment", coated on a plastic, paper or metal base. Information to be recorded is stored in the magnetic pigment applied to the base as a series of small domains magnetized by a recording head. The coating layer of the magnetic pigment includes a binder system which provides a cohesive matrix between the magnetic pigment particles and adheres such particles to the base.

The magnetic coating is applied to the base by coating equipment such as, for example, a gravure roll coater, and the coated base then typically immediately proceeds to a magnetic orientation step wherein orientation of the pigment particles is effected on the undried layer In this step, the long axis of the pigment particles, typically acicular crystals, is made to coincide with the magnetization direction.

In order to achieve good recording performance, the magnetic coating must possess a wide variety of characteristics. Pigment particles, desirably of relatively uniform particle size, should form as high a proportion of the coating layer as possible Further, the degree of dispersion of the pigment particles in the coating, often evaluated as degree of gloss, should be as high as possible. Further, the highly dispersed pigment particles must be capable of being adequately oriented as previously described (the degree of orientation often measured as "squareness").

Still further, the adhesion and wear resistance of the magnetic coating or film should be high Also, the coefficient of friction of the magnetic surface should be low against the head material, and yet have an adequate value against the driving media such as pitch rollers and capstan rollers.

Satisfying these and other diverse criteria have proven to require a delicate balance of basically reciprocal, or opposing, properties. A substantial amount of effort over the years has been directed to improving the various characteristics of magnetic recording media.

To satisfy the performance criteria, the binder system must possess adequate modulus, yet have satisfactory tensile strength and resilience. It has generally been found more desirable to satisfy these criteria by utilizing more than one material in the binder system. Typically, a polymer of relatively high molecular weight which is capable of being cross-linked or cured is utilized to provide the desired modulus Various elastomers are also incorporated to achieve the desired resilience, toughness and durability.

Conventional binder systems include a wide variety of high Tg (viz. — glass transition temperature) hardening polymers or resins, such as, for example, polyacrylates, polyesters, polyester amides, polyhydroxyethers and copolymers from monomers such as vinyl chloride, vinyl acetate, acrylonitrile, vinyl alcohol, vinyl butyral, and vinylidene chloride in combination with low Tg elastomeric polymers, including nitrile rubbers, polyesters, alkyd resins and polyester polyurethanes. The latter elastomers often represent the material of choice for high performance applications. Such resins have excellent toughness and abrasion resistance. Typically, the hardening polymers contain hydroxyl functionality since cross-linking to further increase the modulus, durability and abrasion resistance characteristics can then be achieved by using polyfunctional isocyanates.

The degree of dispersion and the capability of the pigment particles to be oriented in many binder systems are often considered inadequate in the absence of dispersion aids. A wide variety of techniques have been proposed to improve these characteristics. Thus, many surface active agents have been employed for this purpose. These include higher aliphatic amines, higher fatty acids, phosphoric acid esters of higher alcohols such as polyoxyethylene phosphate alkyl ethers, esters of higher fatty acids and sorbitol, sodium alkylbenzenesulfonate, betaine-type, nonionic surface active agents and the like.

Magnetic coatings obtained by employing such surface active agents generally exhibit uniform dispersion of magnetic powder as well as good orientation when the powder or pigment is in the form of acicular particles. On the other hand, utilization of such agents often adversely affects wear resistance or causes difficulties in quality during use. These problems are often attributed to migration or blooming of such surface active agents to the magnetic coating surface or to unnecessary plasticization of the hardening resin or of other components in the magnetic coating.

One attempt to obviate the migration problem is suggested by Great Britain Patent 2,097,415A. This patent suggests using, with a cross-linkable or polymerizable resin binder, a phosphoric acid ester having at least one polymerizable unsaturated double bond. Preferably, the phosphoric acid ester is a product obtained by reacting a phosphoric acid ester of a compound having two or more hydroxyl groups with an acrylic or methacrylic compound having a functional group reactive with an isocyanate group and also with a polyisocyanate compound The phosphoric esters disclosed include two major types: (1) the reaction products of a long chain alkylether or polyester, an acrylic or methacrylic compound having a functional group reactive with an isocyanate group, and a polyisocyanate compound with (2) phosphoric esters of hydroxyalkyl acrylates. Other, binder systems disclosed utilize compounds having various hydrophilic groups such as sulfates, sulphonates, phosphonates and the like.

Japanese application 116,474 discloses a magnetic layer binder composition of a polyurethane and optionally a polyester containing sulphonate groups, and a vinyl chloride polymer containing sulphonate, sulphate, carboxylate or phosphonate groups. The binder is stated to have good dispersing function to magnetic powder and the recording medium to have excellent service durability and good surface gloss.

Japanese Patent J57092421-A(8229) discloses a magnetic recording medium which includes a polyester urethane having (1) at least one hydrophilic group such as $-SO_3M$, $-OSO_3H$, $-COOM$, $-P(O)(OM')_2$, $-NH_2$, $-NHR$, $NR_1R_2$, $NR_1R_2R_3$, wherein M may be H, Li, Na or K; M' may be H, Li, Na, K or a hydrocarbon groups; and the R groups may be hydrocarbon groups and (2) at least two acrylic type double bonds.

Japanese J57092422-A(8229) discloses a magnetic layer containing a polyurethane or polyester resin having (1) at least one hydrophilic group selected from $-OSO_3H$, $-COOM$, $-P(O)(PM')_2$ wherein M may be H, Li, Na, K and M' may be H, Li, Na, K or a hydrocarbon group and (2) a molecular weight of 200 to 5000 per hydrophilic group.

International Publication No. W08400240-A discloses a magnetic recording medium containing a polyvinyl chloride-vinyl acetate-vinyl alcohol and a polyurethane resin containing polar groups such as $-SO_3M$, $-OSO_3M'$, $-COOM$ or

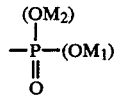

wherein M may be H, Li, Na or K and $M_1$ and $M_2$ may be Li, Na, K or an alkyl group, preferably an alkyl group with up to 23 carbon atoms.

Japanese J55117734-A(8043) discloses a binder for a magnetic recording medium which contains a copolymer of a phosphoric acid ester of an alkylene glycol acrylate or an alkylene glycol methacrylate and a copolymerizable monomer. The wetting properties to ferromagnetic material is stated to be very good, so that dispersibility in the binder is improved. Blooming is said not to occur as no high aliphatic acid, metallic soap, or the like is used.

Among the binder polymers in use in magnetic coating media are commercially available, partially hydrolyzed, (viz. — partly saponified) vinyl chloride — vinyl acetate copolymers and terpolymers. Unfortunately, the dispersion and orientation characteristics of coatings utilizing such binder polymers are typically less than is desired. Considerable efforts have been undertaken to improve these characteristics with the use of a wide variety of dispersion aids.

U.S. Pat. No. 4,420,537 to Hayama et al. thus discloses a magnetic recording medium including a commercially available vinyl chloride-vinyl acetate-vinyl alcohol copolymer and a phosphoric ester type anionic surfactant (e.g. - "GAFAC RE 610"). It is noted that when the content of the surfactant is more than 5 weight percent of the coating, the surfactant is bloomed out from the magnetic layer.

U.S. Pat. No. 4,153,754 to Huisman notes difficulties with prior dispersing agents. Low molecular weight agents, such as lecithin, have the disadvantage that an excess is necessary to fully cover the particles to be dispersed. The high molecular weight dispersing agents, as described, for example in Netherlands Patent Application No. 65.11015, have the disadvantage that, due to their poor wetting properties, agglomerates of the particles are also covered with a dispersing agent. It is not readily possible, or it is possible only by the use of much energy, to disintegrate such agglomerates to individual particles. Huisman suggests using an N-acylsarcosine derivative as a dispersing agent with the binders. The Examples show use of such a dispersing agent with a commercially available vinyl chloride-vinyl acetate-vinyl alcohol terpolymer.

U.S. Pat. No. 4,291,100 to Horigome et al. discloses a magnetic recording medium utilizing a polyoxyethylenesorbitane higher fatty acid ester surfactant. The Examples include use of such surfactants with vinyl chloride-vinyl acetate copolymers and vinyl chloride-vinyl acetate-vinyl alcohol terpolymers.

U.S. Pat. No. 4,305,995 to Ota et al. shows a magnetic recording medium including a mixture of sorbitane mono-, di- and tri- higher fatty acid ester surfactants. The Examples show use of such surfactants with vinyl chloride-vinyl acetate copolymers.

U.S. Pat. No. 4,330,600 to Kawasumi et al. discloses a magnetic recording medium in which the dispersion characteristics of magnetizable particles are improved which results in improved saturation magnetic flux density and squareness ratio. These are achieved by treating the magnetizable particles with a titanium alcoholate compound having at least one group which is easily hydrolyzed and at least one oleophilic group which is hard to hydrolyze in an organic solvent. The Examples show use of such titanium alcoholates with a commercially available vinyl chloride-vinyl acetate copolymer binder.

U.S. Pat. No. 4,400,435 to Yoda et al. notes that vinyl chloride-vinyl acetate copolymers have been used as binders, but that such copolymers do not have functional groups whereby it is easy to improve the dispersibility of magnetic powder in a magnetic layer. It is further said that it is not easy to carry out a thermosetting reaction. The use of vinyl chloride-vinyl acetate-vinyl alcohol copolymers instead had been proposed; and, because of the hydroxyl groups present, the dispersibility of magnetic powder is improved and the thermosettable reaction can be performed. However, because of the vinyl alcohol component, the glass transition temperature of the copolymer is disadvantageously high so as to provide difficulties in improving the surface properties by a calender process. A magnetic recording medium having improved orientation and maximum residual magnetic flux density is provided by using a vinyl chloride-vinyl acetate-maleic acid copolymer having a content of the maleic acid component of at least 1.5 percent.

In addition, there are available various vinyl chloride-vinyl acetate resins which are employed in magnetic recording media. For example, such resins include vinyl chloride-vinyl acetate-vinyl alcoholmaleic acid polymers in which the vinyl alcohol portion is obtained by hydrolysis.

J56077930-A(8133) discloses magnetic recording media in which a substrate is coated with a magnetic lacquer composed of ferromagnetic powder bonded with a binder containing a copolymer of 70–95 weight percent vinyl chloride and 1–25 weight percent hydroxyethylacrylate or hydroxyethylmethacrylate and 0–10 (meth)acrylic acid. It is stated that the squareness ratio and mass residual magnetic flux density are improved. When polyisocyanate (hardening agent) is added, the abrasion resistance is also improved.

U.S. Pat. No. 4,415,630 to Kubota et al. discloses a radiation-sensitive modified resin which is capable of being cross-linked by radiation. As one example, thermoplastic resins which can be effectively modified for radiation sensitivity include vinyl chloride-based copolymers such as vinyl chloridevinyl acetate-vinyl alcohol copolymers, vinyl chloride-vinyl acetate-maleic acid copolymers, and vinyl chloride-vinyl acetate-end-OH-side-chain alkyl radical copolymers. Such thermoplastic resins which have one or more hydroxyl groups in the molecule can be reacted with a polyisocyanate compound, followed by reaction with a monomer having groups reactive to the isocyanate group and also having unsaturated double bonds that harden upon irradiation at a rate of one molecule of the former to one or more molecules of the latter. A further example involves a reaction product of the compound having at least one epoxy group in the molecule and a monomer having groups reactive with the epoxy group and also having radiation-setting, unsaturated double bonds. Specifically, an epoxy-containing thermoplastic resin, obtained by radical polymerization with glycidyl alcohol, is reacted with acrylic acid. By the ring-opening reaction of the carboxyl and epoxy groups, a resin is obtained which carries the acrylic double bonds as a pendant group.

Further, U.S. Pat. No. 3,755,271 to Montgomery discloses terpolymers of vinyl chloride, vinyl acetate and certain acrylic esters. These terpolymers can be employed alone or in admixture with other resins to make useful coatings. U.S. 3,884,887 to Montgomery provides a similar disclosure.

Also, East German DL140-463 discloses a crosslinkable binder for providing improved weather resistance, particularly to water, for various substrates. The composition comprises an acrylate ester, vinyl chloride, maleic acid or the half ester and one of the following: an epoxy containing monomer or (2) hydroxyethylacrylate or (3) a derivative of methylacrylamide.

Japanese Publication JA7203734-R discloses a composition which is said to provide good weathering properties and chemical resistance. The composition includes 2-6 weight percent of acrylic acid or maleic acid, 3-15 weight percent of glycidyl methacrylate and hydroxyethylacrylate, and 79-95 weight percent of an acrylate ester, alone or with other olefinically unsaturated monomers such as styrene or vinyl chloride.

U.S. Pat. No. 4,277,388 to Kagami et al. discloses a thermoplastic resin that is a hydrolyzed product of a vinyl chloride copolymer. The copolymer composition is 50 to 80 weight percent vinyl chloride monomer, 20 to 40 weight percent of a vinyl ester monomer and 0 to 15 weight percent of a comonomer polymerizable with the vinyl chloride monomer. This copolymer, which must have an average polymerization degree of 200 to 800, is then hydrolyzed (saponified) so that the product has an infrared absorption ratio of OH/CH of from 0.5 to 0.9. If used, the comonomer, which can be a carboxylic acid, must be capable of providing an OH/CH ratio in the above range and the amount utilized is that necessary to provide said OH/CH ratio U.S. Pat. No. 4,594,174 to Nakayama et al. discloses a magnetic paint for use in magnetic recording media including a copolymer resin having a bonded carboxyl group content of 0.3 to 5.0 percent by weight, a bonded epoxy group content of at least 0.5 percent by weight, and a vinyl chloride content of at least 60% by weight. It is noted that when the carboxyl group content is less than 0.3 percent dispersion is poor, while when carboxyl group content is greater than 5.0 percent, the resulting viscosity of the magnetic paint is too high. With respect to the bonded epoxy group content, the patent discloses that if the epoxy group content is less than 0.5 weight percent, the thermal stability of the resin is unsatisfactory.

U.S Pat. No. 4,431,712 to Matsufuji et al. shows a binder for magnetic recording media which contains a carboxyl-containing vinyl chloride/vinyl acetate copolymer. The composition of this copolymer is 8095 weight percent vinyl chloride, 3-20 weight percent vinyl acetate, and 1 to 5 percent polymerizable unsaturated carboxylic acid. However, use of a dispersant in addition to the unsaturated carboxylic acid is also necessary.

U.S. Pat. No. 4,476,035 to Miyoshi et al. discloses a copolymer for use in magnetic media composed of (a) 50 to 90 weight percent vinyl chloride, (b) vinyl carboxylate ester, (c) 3 to 20 weight percent of vinyl alcohol and (d) 0.1 to 5 parts by weight (based on 100 parts of (a) +(b) +(c)) of unsaturated dicarboxylic acid anhydride. If the content of vinyl alcohol, which is obtained by saponification of the vinyl carboxylate ester, is less than 3 weight percent, dispersion of the magnetic powder cannot be improved.

In addition, while vinyl chloride compositions are highly desirable for use as binder resins in magnetic recording media, it has long been recognized that compositions having improved thermal stability would be highly desirable. This is apparent because a wide variety of conditions must be met. Thus, binder resins must be storage stable under ambient conditions as well as being stable during a variety of processing operations in forming the various products, including grinding, drying and calendering operations. Likewise, the product must not unduly degrade in storage and must provide substantial durability in operation.

From the product performance standpoint, a high level of stability is desirable for such binder resins so that the magnetic recording medium performs adequately during its expected lifetime. The primary binder function of holding the particulate magnetic pigment on the base film through the rigors of production and use are critically dependent upon the molecular weight of such resins. Cumulative exposure to higher temperatures can reduce the molecular weight of vinyl resins, which results in premature mechanical failure. The obvious flaking of pigment and loss of information can be, of course, catastrophic. Degradation often manifests itself with low molecular weight products blooming to the surface with fouling of the heads or tape sticking to the guides.

Another failure mode results from the failure of the other components in the system due to the evolution of HCl from vinyl chloride resins. Thus, the polyester urethane elastomer binder ingredient often used in such media can itself degrade through acid-catalyzed hydrolysis. The loss of molecular weight and evolution of blooming species can cause the same problem as the primary degradation in the hardening polymer. In the extreme case, low levels of HCl could well be generated during long-term, still-frame playing which could corrode the head surfaces.

The substantial efforts in this field, as discussed herein, underscore the difficulties in providing economic vinyl chloride resins capable of imparting to magnetic recording compositions the many and diverse characteristics desired. Indeed, despite the considerable prior effort, the need remains for vinyl chloride resins that cannot only impart in a magnetic coating the desired dispersion and magnetic characteristics over a wide variety of usage requirements but also provide desirable rheological characteristics. More specifically, while many of the prior efforts impart adequate dispersion and magnetic characteristics, these properties are achieved at the expense of the viscosity of the magnetic coating. These higher-than-desired viscosities have tended to thwart the use of such modified vinyl chloride resins due to the difficulties encountered in preparing the coatings, i.e., cavitation problems and the like. Such viscosity problems have thus caused many magnetic coating manufacturers to use vinyl chloride-vinyl acetate-vinyl alcohol resins in place of other modified vinyl chloride resins even though sucn modified resins can impart more desirable magnetic characteristics.

OBJECTS OF THE INVENTION

A principal object of the present invention is to provide novel vinyl chloride polymers for use in applications such as magnetic coatings to impart desirable dispersion and orientation characteristics while having, as well, desirable rheological characteristics.

Another object of this invention is to provide a novel binder composition for a magnetic recording medium having the above characteristics which also has superior thermal stability characteristics.

A further object of this invention provides a novel binder system for a magnetic recording medium which may be substituted for conventional binders in formulations as essentially a plug-in substitution.

Yet another object lies in the provision of novel compositions that may be obtained by utilizing a straightforward, facile synthesis. A related and more specific object provides binder compositions that may be formed in a one-step, or direct, polymerization.

Another object of the present invention is to provide a binder system for magnetic recording medium which minimizes or eliminates the need to employ a dispersing agent which can cause blooming in use.

A still further object lies in the provision of a magnetic coating which is capable of being processed in conventionally utilized magnetic coating equipment.

These and other objects of the present invention will be apparent from the description set forth hereinafter.

SUMMARY OF THE INVENTION

The present invention is based on the discovery that a binder system for particulate matter, such as in magnetic recording media, which is capable of imparting desirable dispersion and magnetic characteristics and also has excellent rheological characteristics, may be provided by utilizing a copolymer of vinyl chloride, a hydroxyalkyl acrylate or methacrylate or allyl alcohol, and a small amount of monomer having an organic carboxylic acid moiety selected from the group consisting of acrylic acid, methacrylic acid, maleic acid or anhydride, itaconic acid and fumaric acid. In addition, if improved thermal stability is desired, an epoxy-containing vinyl monomer may be included in the copolymer. Optionally, the binder system can include minor amounts of a vinyl ester such as vinyl acetate.

The relative amounts of the various constituents of the binder resins of this invention must be carefully tailored to provide the desired composite properties. Thus, the relative amount of vinyl chloride should be adequate to provide the desired mechanical characteristics, as determined by the Tg (viz. — glass transition temperature) for the resin. The hydroxyalkyl acrylate or methacrylate or allyl alcohol should be present in the media, in an amount to provide facile curing with polyisocyanates and miscibility with the elastomer component, when this component is used. Pursuant to this invention, it has been found that utilizing a low level of the organic carboxylic acid moiety will provide the desired dispersibility and magnetic characteristics, while also providing the desired rheological characteristics. The epoxy-containing moiety is present in an amount necessary to provide the desired thermal stability. Vinyl esters such as vinyl acetate may be used in minor amounts, commonly being incorporated in the preparation of vinyl chloride polymers to impart processing latitude.

In accordance with the present invention, since a monomer containing a carboxylic group is used to provide the acid functionality, the binder resins can be prepared by a one-step, or direct, polymerization. This affords a facile preparation that can allow considerable economic savings. Thus, it is considered that any post modification following preparation of a polymer can add at least 50% to the manufacturing cost.

DETAILED DESCRIPTION OF THE INVENTION

Resin Composition

The vinyl chloride constituent will generally be the major component that determines the adequacy of the mechanical properties necessary to appropriately function as a binder resin in magnetic recording media and the like. Accordingly, it is necessary to utilize an amount of vinyl chloride sufficient to provide the requisite properties for the resin, which properties can be adequately determined by reference to the Tg of the resin.

It is generally desired to utilize amounts of vinyl chloride adequate to provide the resins of this invention with a Tg of at least 40° C., preferably at least about 50° C., and more preferably at least about 70° C. It will accordingly be necessary to utilize a resin having at least about 70% by weight of vinyl chloride. More preferably, it is desirable to utilize about 80 to about 90% by weight of vinyl chloride. Amounts in excess of about 90% by weight may have inadequate solubility in conventional solvents.

Concerning the hydroxyalkyl acrylate and methacrylate or allyl alcohol constituent, an amount should be present in the resin that is sufficient to provide the requisite cross-linking upon reaction with the polyisocyanate employed and, when used, miscibility with the elastomer. To achieve this result it is preferred to utilize an amount which will provide at least about 0.5% by weight of hydroxyl groups. As an upper limit, since these constituents will typically have a Tg substantially less than that of vinyl chloride, it is accordingly desirable to utilize an amount which provides no more than about 2.5% by weight of hydroxyl groups, although amounts providing up to about 3% hydroxyl groups may be employed in some applications. In this connection, relative to the hydroxyalkyl acrylates, somewhat higher amounts of the hydroxyalkyl methacrylates may be employed since the Tg of such monomers will generally be somewhat higher.

Among the hydroxyalkyl acrylates and methacrylates, it is preferred from an economic standpoint to utilize either hydroxypropyl acrylate or hydroxyethyl acrylate. While less advantageous from an economic standpoint, other species that may desirably be utilized include hydroxyethyl methacrylate and hydroxypropyl methacrylate and allyl alcohol. The methacrylates have an advantage in performance because their Tg is higher than that of the acrylates.

With respect to the monomer yielding or having a carboxyl group, an amount should be utilized which will provide from about 0.05 to about 0.3 percent carboxyl functionality. This will correspond, for example, to a range of about 0.0625 to about pb 0.375 percent by weight of maleic acid. More preferably, an amount should be utilized which will provide from about 0 1 to about 0.25 percent of carboxyl functionality. Use of an amount in this range imparts excellent dispersibility to the binder, and in addition provides excellent rhelogical characteristics. Although use of amounts providing greater than about 0.3 percent carboxyl functionality will result in a binder having satisfactory dispersion characteristics, the rheological characteristics of the binder will become unsatisfactory because the additional carboxyl groups will cause an undesirable increase in viscosity. This is particularly evident when minor amounts of optional dispersing aids are used. Such optional dispersing aids are often desired to provide improved compatibility when an elastomer is employed in the magnetic coating. Manufacturers tend to utilize as low an amount as will provide the desired compatibility since excessive amounts cause deterioration of the desired durability and hardness characteristics of the coating. It is accordingly desired to utilize a carboxyl group level that will have acceptable viscosity not only when no optional processing aid is utilized but also when an optional processing aid is incorporated into the coating in an amount up to 1 percent by weight.

Among the organic carboxylic acids which are useful are acrylic, methacrylic, maleic , itaconic, fumaric, and the like. Of course, anhydrides such as maleic anhydride can likewise be employed in the synthesis of the resins.

If additional thermal stability is desired, a compound providing a source of oxirane oxygen is utilized. Epoxy-containing vinyl monomers such as acrylic or methacrylic esters may thus be employed. More specifically, glycidyl acrylates and methacrylates are useful, as is 4-vinyl cyclohexene monoepoxide (sometimes referred to as "vinylcyclohexene monoxide"). Other species that should be capable of being employed include methyl glycidyl methacrylate, methyl glycidyl acrylate, allyl glycidyl ether, the allyl glycidyl ether of bisphenol-A, allyl phenol glycidyl ether, glycidyl butadiene, and the like.

The amount of the epoxy-containing vinyl monomer should be that which provides the resin with the desired heat stability. Relatively higher molecular weight resins tend to be more stable than lower molecular weight vinyl chloride copolymers. Accordingly, the amount utilized will be determined, in part, by the molecular weight of the resin being prepared. Typically, an amount that provides from about 0.1 to 1.5 percent oxirane oxygen should be useful. This will correspond, for example, to about 1 to about 12 percent by weight of glycidyl methacrylate. Another major consideration in the amount utilized is the Tg of the resin itself since most useful constituents will reduce the Tg of the resin.

Optionally, and if desired, a vinyl ester such as vinyl acetate may be employed. Other useful vinyl esters include vinyl formate, vinyl propionate, vinyl butyrate and the like. Other higher vinyl esters up to about 6 carbon atoms also may be used, if desired. Typically, such vinyl esters are employed in preparing vinyl chloride copolymers and terpolymers so as to allow what is considered to be improved processing latitude. Suitable amounts can vary up to about 12% by weight of the resin.

Preparation Of The Resin

Conventional solution polymerization techniques may be desirably utilized, as will be discussed hereinafter, to form the binder resins of this invention. Similarly, other polymerization techniques such as conventional suspension or emulsion polymerization may also be used. Thus, the process employed for making the resins of this invention is not critical, and such technology is well understood by those in the art. Suitable preparative techniques are, for example, set forth in U.S. Pat. No. 3,755,271.

In general, and as an illustrative example, the resins of this invention may be prepared by utilizing solution polymerization, employing a solvent for the resulting resin as well as for the various components employed Suitable solvents include, for example, the conventional ester solvents such as acetone, butyl acetate, ethyl acetate, isopropyl acetate, and the like, as well as the ketone solvents such as methylethylketone, methyl-n-butylketone, methylisopropylketone, and the like.

The polymerization may be carried out either batchwise or continuously. Typically, the ratio of solvent/monomer will vary from about 0.3/1 to about 4/1, depending upon the molecular weight desired. The temperature selected may vary from about 35° C. to about 80° C., depending upon the reaction rate and resin molecular weight desired. Any oil-soluble, free radical catalyst may be used in an amount varying from about 0.01 to about 3.0%, based on the weight of the monomer. Suitable catalysts include, as illustrative examples, dibenzoyl peroxide, dilauroyl peroxide, azobisbutyronitrile and isopropyl peroxide carbonate. Any pressure above the vapor pressure of the components of the system may be employed, pressures from about 30 to 100 psi being typical.

In accordance with one aspect of this invention, since the requisite acid functionality is provided by employing an organic carboxylic acid monomer, the resins of the present invention may be prepared in a direct, one-step polymerization. Surprisingly, it has been found that the resin preparation may be carried out without any significant by-product reactions taking place, such as might be expected to occur between the organic carboxylic acid and, when used, the epoxy monomer. Indeed, these resins may be prepared using the equipment and reaction parameters employed in making commercially available vinyl chloride-vinyl acetate copolymers and the like.

Magnetic Recording Medium

Base

Any base or substrate may be utilized, and the particular substrate of choice will be dictated for the most part by the particular application. Polyethylene terephthalate and polypropylene films are in wide use as base materials for magnetic recording media. Where heat resistance is an important consideration, a polyimide film, polyamide film, polyarylether film, or the like may be utilized In the case of a polyester film as a thin base, it is often used after monoaxial or biaxial orientation. It is likewise well known that pretreatment of the film may be beneficial to promote wetting and adhesion.

Composition of the magnetic coating layer

The magnetic particles may be any of those known and useful in conventional magnetic recording media. Representative examples include acicular or granular $\gamma Fe_2O_3$, $Fe_3O_4$, Co-doped : $\gamma Fe_2O_3$, Co-doped $\gamma Fe_2O_3$-$Fe_3O_4$ solid solution, Co-base-compoundadsorbed $\gamma$-$Fe_2O_3$, a Co-base-compound-adsorbed $Fe_3O_4$ (including those oxidized to an intermediate state between itself and $\gamma$-$Fe_2O_3$), and acicular $CrO_2$. (The term "Co-base compound" as used herein means cobalt oxide, cobalt hydroxide, cobalt ferrite, cobalt ionadsorbates and the like which enable the magnetic particles to take advantage of the magnetic anisotropy of cobalt in improving its coercive force). Also, the magnetic particle may be a ferromagnetic metal element or alloy, such as Co, Fe-Co, Fe-Co-Ni, or the like. Such a fine magnetic particle is prepared in a number of ways, including wet reduction of the starting material with a reducing agent such as $NaBH_4$, a treatment of the iron oxide surface with a Si compound and subsequent dry reduction with $H_2$ gas or the like, and vacuum evaporation in a low-pressure argon gas stream. Fine particles of monocrystalline barium ferrite may be employed as well. The fine magnetic powder is used in the form of acicular or granular particles, depending on the application of the resulting magnetic recording medium.

It will be generally desirable to utilize a relatively large amount of magnetic particles in the coating layer. Typical compositions of the coating layer will thus include about 65 or 70 to about 85 or 90 percent magnetic particles, based upon the total weight of the coating layer. As is known, it is desirable to utilize pigment particles of relatively uniform size, with typically used particles having a long axis of about 0.4 micron or even less being employed.

The remainder of the coating layer will comprise the binder system, including the hardening resin, and typically an elastomeric polymer, a dispersant, a crosslinker and any auxiliary agents. Depending upon the resin of the present invention which is utilized, the dispersant as such may be minimized or even eliminated.

Conceptually, however, in addition to the pigment particles, the only additional essential component in accordance with this invention is the hardening resin itself and the crosslinker. Typical coating layers will, however, often include the additional components identified depending upon the particular end use application. As is apparent from the amount utilized in typical formulations of the pigment particles, the remainder of the coating layer will generally represent about 10 or 15 to 30 or 35 percent by weight of the coating layer.

As has been previously discussed, the binder system will generally desirably include an elastomeric polymer in an amount sufficient to provide the coating layer with the desired resilience and the like. Many elastomeric polymers suitable for this purpose are known and may be utilized. Polyester urethanes are often preferred for high performance applications. Suitable materials are commercially available. These materials may be, in general, described as the reaction products of polyester polyols, short chain diols, and isocyanates. These resins have excellent toughness and abrasion resistance characteristics.

A wide variety of polyisocyanate crosslinkers are known and may be used. Typically, polymeric polyisocyanates are employed. As one example, it is suitable to use polymeric toluene diisocyanate (TDI) adducts. The amount of the crosslinking agent used is typically about 20 to 50 percent of the amount that would be required based upon the hydroxyl stoichiometry, although up to 100% of the stoichiometry may be employed, if desired.

As is known, a variety of auxiliary agents are sometimes employed in the magnetic coating layer. Such additives are known and may be employed, if desired for the particular application. Examples of such auxiliary agents include antistatic agents, lubricants, sensitizers, leveling agents, wear-resisting agents, and film-reinforcing agents.

In accordance with the present invention, the magnetic coating layer utilizes the resins of the present invention to provide the necessary dispersing and orientation characteristics of the coating, and to function as the hardening resin as well. No other hardening resin need be employed; however, if desired, the resins of the present invention can be utilized with compatible hardening resins to provide the desired magnetic coating layer.

In accordance with this invention, the use of the resins of the present invention should provide improved dispersion and orientation characteristics. However, if desired, other conventional dispersing agents may be employed.

Preparation of Coating

The recording medium may generally be prepared by dissolving the binder system in a sufficiently volatile vehicle to provide a coatable dispersion of fine magnetizable particles. The dispersion can then be coated onto the substrate to provide a coating thereon. The magnetic recording medium may be prepared by methods described in the art such as in, for example, S. Tochihara, "Magnetic Coatings and Their Applications in Japan", Progress in Organic Coatings, 10 (1982), pages 195 to 204.

Other Applications

While use of the resins of the present invention provides highly advantageous properties in magnetic recording media and the present invention has been described in conjunction with this application, it should be appreciated that such materials likewise can be utilized as dispersants and/or hardening resins in any other application where the characteristics of such resins could desirably be incorporated. For example, conventional zinc-rich coatings are useful in many applications which require corrosion resistance and the like. Such compositions typically comprise a high percentage of zinc particles (up to 85 to 90 percent by weight of the composition) and a resin together with such optional components as anti-settling agents, thickening agents and water scavengers, as is known. For zinc-rich maintenance coatings, and other clear and pigmented coatings, any of the resins of the present invention should provide improved dispersibility and thus improved adhesion to substrates. The resins of this invention can accordingly be readily utilized in conjunction with such coatings.

EXAMPLES

The following Examples are representative of the present invention, and not in limitation thereof. The starting materials used, abbreviations employed, control resins evaluated, polymerization method used, the preparation of the magnetic media formulations, and the evaluation techniques utilized in the ensuing Examples were as follows:

Starting Materials and Control Resins

Elastomer A

B.F. Goodrich "Estane ®5701 F-1" polyester polyurethane elastomer having a specific gravity of 1 21, a Tg of −25° C. and a Brookfield viscosity of 300 cps. for a 15% total solids solution in tetrahydrofuran.

Resin A

A commercially available vinyl chloride-vinyl acetate-vinyl alcohol terpolymer having a composition of 90/4/6, respectively, and an intrinsic viscosity of 0.53.

Resin B

A commercially available vinyl chloride copolymer containing hydroxypropyl acrylate and vinyl acetate, and having a composition of 82/13/5, respectively, and an intrinsic viscosity of 0.56.

Abbreviations Used

The following abbreviations are used in the following Examples:
VC1 — vinyl chloride
VAc — vinyl acetate
GMA — glycidyl methacrylate
HPA— hydroxypropyl acrylate
MA— maleic acid
BA— butyl acrylate
AA— acrylic acid
SR— squareness ratio
SFD— switching field distribution Polymerization Procedure

Vinyl Copolymer

The vinyl chloride copolymers were produced via continuous solution polymerization in a stainless steel stirred tank reactor. Vinyl chloride and the other monomers used, as well as the solvent, were pre-mixed and fed continuously to the reactor. The free radical initiator, diisopropyl/peroxydicarbonate, was also fed continuously as an acetone solution, at a rate necessary to maintain constant conversion. Product solution was continuously withdrawn from the reactor. The temperature in the reactor was maintained at 50°–60° C. while the pressure was kept between 90–110 psi.

The product solution was stripped of unreacted vinyl chloride monomer. The polymer was then recovered from solution by precipitation with an isopropanol/water mixture, filtered, and dried in a fluid bed drier.

Preparation Of The Magnetic Media Formulations

Formulations were prepared by premixing 134 grams of a 15 percent cyclohexanone solution of the resin with 160 grams of cyclohexanone and adding 200 grams of cobalt-modified, iron oxide magnetic pigment with particles having a long axis of about 0.4 micron ("PFERRICO 2566" magnetic pigment, Pfizer, Inc.). After the mixture was well blended with an air stirrer for 15–30 minutes, the resulting slurry was added to a Premier Mill filled with 1.3mm. glass beads and milled for about one hour.

Elastomer A was added to the formulation, 134 grams of a 15% solution in cyclohexanone being used. The formulation was then milled for an additional hour and discharged.

Magnetic Media Evaluations

Gloss

This was evaluated by preparing a 1 mil drawdown on glass, allowing the formulation to air dry and then measuring the gloss with a 60° gloss meter.

Squareness

This was measured by preparing a 3 mil wet drawdown on a Mylar substrate and then pulling the Mylar across a bar magnet to orient the magnetic particles. Squareness was then measured on a 2×2 inch piece of this oriented coating using a LDJ Model 7000A B-H Meter. According to the pigment manufacturer, the maximum squareness achievable with the magnetic pigment utilized is 0.84.

Examples 1–3

These Examples show the utilization of vinyl resins of the present invention, made using resins prepared in direct polymerization, in magnetic recording media and compare the magnetic, dispersion and rheological characteristics of the resulting media with, as controls, the characteristics obtained using commercially available resins as well as resins having an excessive carboxyl content. The effect of the inclusion of minor amounts of an optional processing aid upon such characteristics is also set forth.

Resins according to the present invention were made having the following compositions by weight, as well as resins having excessive carboxyl contents:

TABLE I

| Composition | Examples | | | Controls | |
|---|---|---|---|---|---|
| | 1 | 2 | 3 | 1 | 2 |
| VCl | 82.4 | 82.0 | 82.0 | 83.0 | 79.0 |
| HPA | 13.0 | 13.0 | — | 14.0 | 12.0 |
| MA | 0.3 | 0.3 | 0.3 | 0.56 | — |
| AA | — | — | — | — | 1.1 |
| BA | — | — | 13.0 | — | — |
| VAc | 4.3 | 4.7 | 4.7 | 2.44 | 7.9 |

Magnetic recording media were prepared using the resins in Table I, as well as commercial resins, and the magnetic properties and viscosity are set forth below:

TABLE II

| Magnetic Recording Media | Optional Dispersing Aid (wt %)* | Property | | |
|---|---|---|---|---|
| | | 60° Gloss | Squareness Ratio | Viscosity (CP) |
| Ex. 1 | 0 | 96 | .817 | 1850 |
| | 1 | 98 | .840 | 2050 |
| | 2 | 93 | .845 | 2700 |
| | 3 | 95 | .820 | 3100 |
| Ex. 2 | 0 | 102 | .842 | 2100 |
| Ex. 3 | 0 | 102 | .840 | 2300 |
| Control 1 | 0 | 96 | .819 | 2500 |
| | 1 | 94 | .848 | 3500 |
| | 2 | 80 | .818 | 4100 |
| | 3 | 40 | .800 | 4300 |
| Control 2 | 0 | 86 | .817 | 2900 |
| Resin A | 1 | 18 | .795 | 2000 |
| | 3 | 35 | .846 | 1000 |

TABLE II-continued

| Magnetic Recording Media | Optional Dispersing Aid (wt %)* | 60° Gloss | Squareness Ratio | Viscosity (CP) |
|---|---|---|---|---|
| Resin B | 3 | 25 | .851 | 1400 |

*"Centrolex P"- soya lecithin (Central Soya, Fort Wayne, Indiana)

This, as can be seen, the utilization of the vinyl chloride resins of the present invention obtained in comparison to those obtained using the commercially provides the magnetic coating with a dispersion viscosity on the same order as that which results when commercially available resins are used while superior dispersion and magnetic characteristics are available resins. In contrast, while satisfactory dispersion and magnetic characteristics are obtained, the use of resins having excessive carboxyl content results in media having undesirably high viscosities.

We claim:

1. A vinyl chloride polymer consisting essentially of:
   (a) vinyl chloride in an amount of about 70 to about 90 percent by weight;
   (b) hydroxyalkyl acrylate in an amount to provide about 0.5 to about 3 percent by weight hydroxyl groups;
   (c) acrylic acid, methacrylic acid, itaconic acid, fumaric acid or maleic acid in an amount to provide about 0.05 to about 0.3 percent by weight carboxyl groups.

2. A vinyl chloride polymer as defined in claim 1 consisting essentially of:
   (a) vinyl chloride in an amount of about 80 to about 90 percent by weight;
   (b) hydroxyalkyl acrylate in an amount to provide about 0.5 to about 2.5 percent by weight hydroxyl groups;
   (c) acrylic acid, methacrylic acid, itaconic acid, fumaric acid or maleic acid in an amount to provide about 0.1 to about 0.25 percent by weight carboxyl groups.

3. A vinyl chloride polymer as defined in claim 1 wherein component (b) is hydroxyethyl acrylate or hydroxypropyle acrylate.

4. A vinyl chloride polymer as defined in claim 1 wherein component (c) is maleic acid.

5. The cured product of the polymer defined in claim 1.

6. A magnetic recording medium comprising a substrate and a magnetic recording layer thereon containing magnetic particles and as a binder for said particles, the cured product of the polymer defined in claim 1.

7. A vinyl chloride polymer consisting essentially of:
   (a) vinyl chloride in an amount of about 70 to about 90 percent by weight;
   (b) hydroxyethyl acrylate or hydroxypropyl acrylate in an amount to provide about 0.5 to about 3 percent by weight hydroxyl groups;
   (c) maleic acid in an amount to provide about 0.05 to about 0.3 percent by weight carboxyl groups.

8. A vinyl chloride polymer as defined in claim 7 consisting essentially of:
   (a) vinyl chloride in an amount of about 80 to about 90 percent by weight;
   (b) hydroxyethyl acrylate or hydroxypropyl acrylate in an amount to provide about 0.5 to about 2.5 percent by weight hydroxyl groups;
   (c) maleic acid in an amount to provide about 0.1 to about 0.25 percent by weight carboxyl groups.

9. A magnetic recording medium comprising a substrate and a magnetic recording layer thereon containing magnetic particles and as a binder for said particles, the cured product of the polymer defined in claim 7.

10. A vinyl chloride polymer consisting essentially of:
    (a) vinyl chloride in an amount of about 70 to about 90 percent by weight;
    (b) hydroxyalkyl acrylate in an amount to provide about 0.5 to about 3.0 percent by weight hydroxyl groups;
    (c) acrylic acid, methacrylic acid, itaconic acid, fumaric acid or maleic acid in an amount to provide about 0.05 to about 0.3 percent by weight carboxyl groups;
    (d) an epoxy-containing vinyl monomer in an amount to provide about 0.1 to about 1.5 percent by weight oxirane oxygen.

11. A vinyl chloride polymer as defined in claim 10 wherein component (d) is glycidyl methacrylate, glycidyl acrylate or 4-vinylcyclohexene monoepoxide.

12. A magnetic recording medium comprising a substrate and a magnetic recording layer thereon containing magnetic particles and as a binder for said particles, the cured product of the polymer defined in claim 10.

* * * * *